United States Patent
Laredo et al.

(10) Patent No.: US 8,868,516 B2
(45) Date of Patent: Oct. 21, 2014

(54) MANAGING ENTERPRISE DATA QUALITY USING COLLECTIVE INTELLIGENCE

(75) Inventors: Jim A. Laredo, Katonah, NY (US); Valentina Salapura, Chappaqua, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 13/399,798

(22) Filed: Feb. 17, 2012

(65) Prior Publication Data

US 2013/0218846 A1 Aug. 22, 2013

(51) Int. Cl.
*G06F 7/00* (2006.01)

(52) U.S. Cl.
USPC ......................................... 707/687

(58) Field of Classification Search
None
See application file for complete search history.

(56) References Cited

U.S. PATENT DOCUMENTS

| 6,243,290 | B1 * | 6/2001 | Kurata et al. ............. 365/185.03 |
| 7,925,638 | B2 * | 4/2011 | Sengupta et al. ............. 707/690 |
| 8,112,440 | B2 * | 2/2012 | Wu et al. ....................... 707/776 |
| 2008/0280662 | A1 | 11/2008 | Matwin et al. |
| 2008/0299531 | A1 | 12/2008 | Jensen |
| 2010/0331075 | A1 | 12/2010 | Michelstein et al. |
| 2012/0203752 | A1 * | 8/2012 | Ha-Thuc et al. ............. 707/706 |

* cited by examiner

*Primary Examiner* — Apu Mofiz
*Assistant Examiner* — Thu Nga Nguyen
(74) *Attorney, Agent, or Firm* — Yee & Associates, P.C.; Louis J. Percello

(57) ABSTRACT

An embodiment of the invention is directed to a method associated with a data processing system disposed to receive and process enterprise data. Responsive to receiving a specified data element, the method determines a data type to be used for the specified data element. The method selectively determines a confidence level of the specified data element, and selects a plurality of subject matter experts (SMEs), wherein the data type of the specified data element is used in selecting each SME. A request is dispatched to each of the SMEs to selectively revise and validate the specified data element. The specified data element is then updated in accordance with each revision provided by an SME in response to one of the requests.

19 Claims, 5 Drawing Sheets

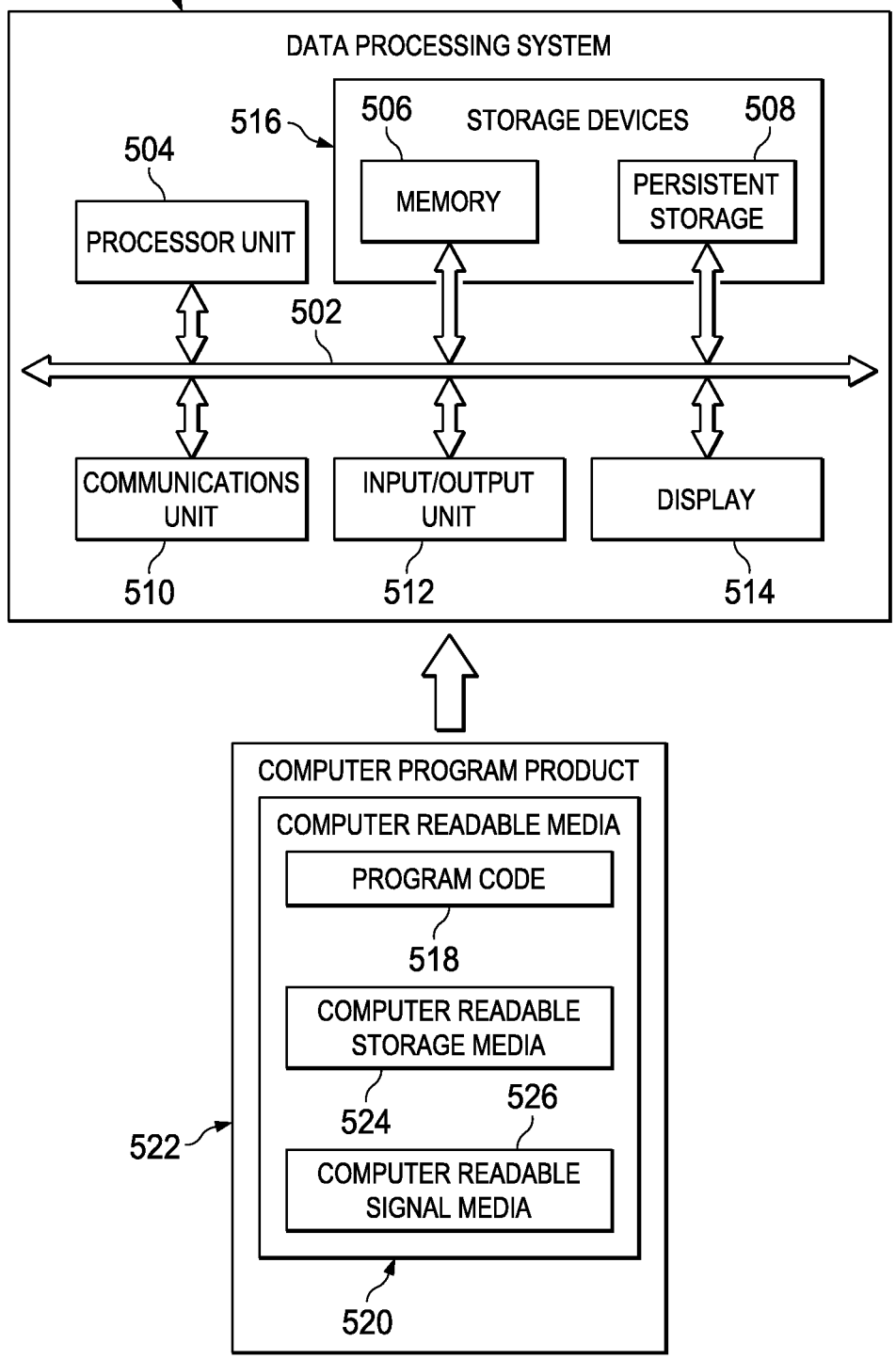

MANAGING ENTERPRISE DATA QUALITY USING COLLECTIVE INTELLIGENCE

BACKGROUND

1. Field

The invention disclosed and claimed herein generally pertains to a system and method for managing enterprise data quality, which makes use of targeted subject matter experts (SMEs) to collectively validate and enhance selected data elements. More particularly, the invention pertains to a system and method of the above type, wherein SMEs are identified by searching information sources such as existing ticket logs and server access logs that are related to the selected data sets or data elements.

2. Description of the Related Art

In regard to data quality, ticketing systems, data stores, and warehouses continue to evolve and mature. This is important, because business insights and problem resolution processes require careful data quality assessment in order to build credibility with stakeholders and to efficiently resolve incidents. However, resources of the above type are not fast enough for many businesses. Also, the quality of a set of data is only as good as the sources which provide it. For example, when humans are entering data, errors can be made due to time pressure, distractions, or for other reasons. Servers or other system components may nominally contain the same set of data, but an update made to the data set in one of the servers may not be made to the data set in the other. Furthermore, data stores and warehouses may use different format and conventions for same data elements leading to further inconsistencies and conflicting results. Also, data quality can vary by request, and with the corresponding data source.

At present, certain tools or systems are available to keep track of the system administrators who have accessed particular servers. Monitoring tools can indicate what was performed, such as the commands that were executed and the times thereof. System logs can be used to determine who, what server, when, and what role was used on each access. Problem tickets may be used to provide context, such as the reported problem, the related account, and the affected server. However, at present there are generally no systems available to automatically and systematically ensure quality of enterprise data that comes from both human and digital sources.

SUMMARY

As used herein, collective intelligence refers to a group of experts that through the collective behavior of the group exhibit characteristics such as judgment or problem-solving. In order to increase service quality in IT outsourcing, by improving the accuracy of knowledge captured, embodiments of the invention use end to end integration of collective intelligence, together with data collection and a validation process. An important aspect of this approach is the ability for a targeted group of network connected experts to collectively or competitively validate and correct required knowledge. By scoping data elements based on importance and business value, it is easier to target specific topics, accounts, and areas. By framing a business goal in the form of a micro-task, which requires an SME to validate a single data element at a time, it is easier to communicate an objective of the task to employees and increase their contribution. Embodiments of the invention also identify gaps in data, and such information can be used to improve data quality in real time.

In embodiments of the invention, it is generally necessary to identify the type of an individual data element in order to validate the data element. As used herein, the terms "type", "data element type", and "data type" mean and refer to the particular nature of a data element. For example, "failure code" would be the "type" of a failure code data element, that is, a data element that provided failure code information. Another example of "type" could be server purpose, as the type of data element that indicated the purpose of a server.

An embodiment directed to a method is associated with a data processing system disposed to receive and process enterprise data. Responsive to receiving a data element, or specified data element, the method determines a data type to be used for the specified data element. The method selectively determines a confidence level of the specified data element, and selects a plurality of subject matter experts (SMEs), wherein the data type of the specified data element is used in selecting each SME. A request is dispatched to each of the SMEs to selectively revise and validate the specified data element. The specified data element is then updated in accordance with each revision provided by an SME in response to one of the requests.

BRIEF DESCRIPTION OF THE SEVERAL VIEWS OF THE DRAWINGS

FIG. 5 is a block diagram showing a computer or data processing system that may be used in implementing one or more components of an embodiment of the invention.

DETAILED DESCRIPTION

Figure 1:
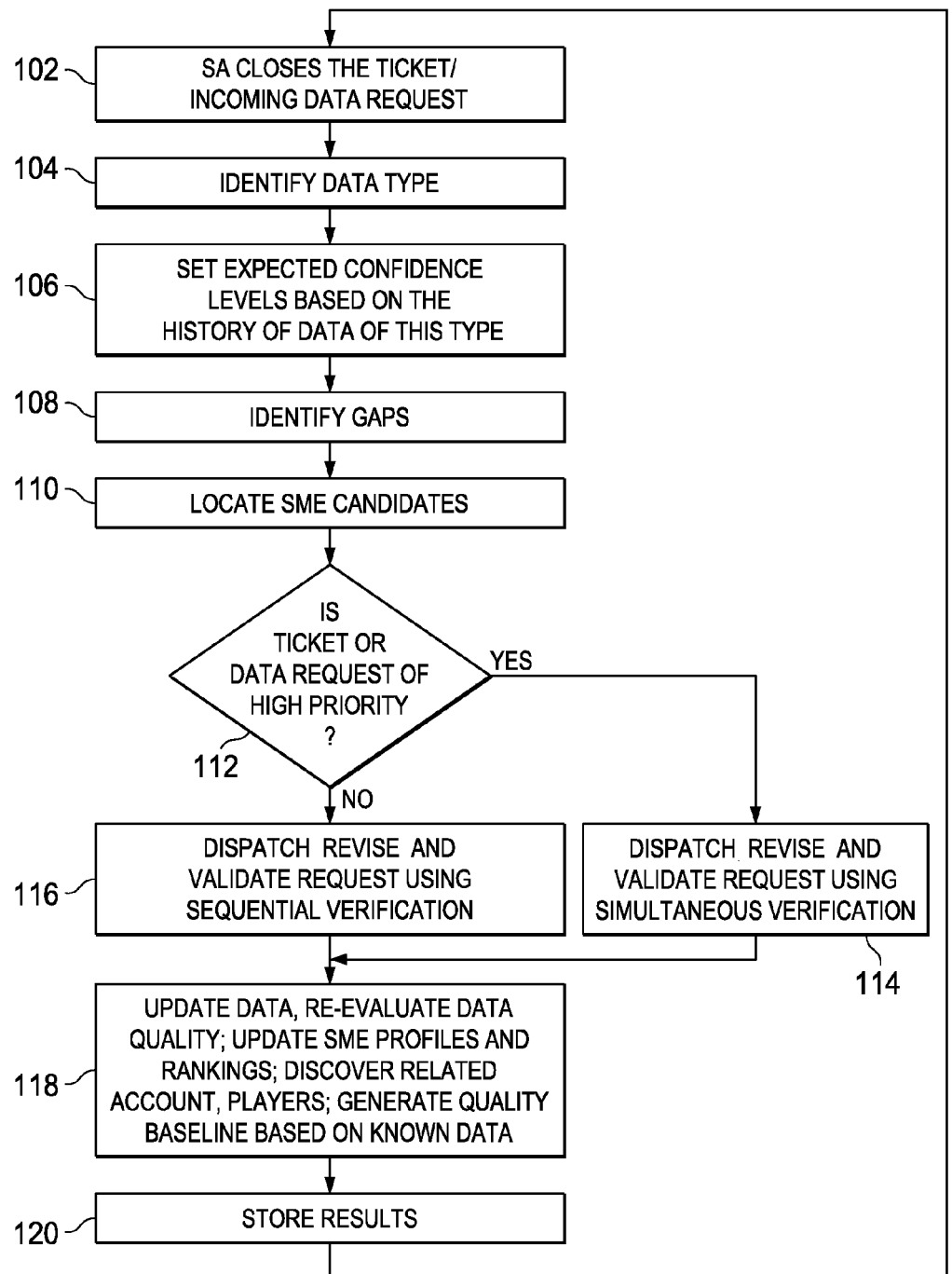
FIG. 1 is a flowchart showing steps for a method comprising an embodiment of the invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Referring to FIG. 1, there are shown steps of a method or process comprising an embodiment of the invention. The process is commenced at step 102 by an event such as an incoming data request, or the action of a system administrator (SA) to close a service ticket or the like. For example, a business analyst could request particular enterprise data that pertains to a report concerning the classification of servers used in a specified industry. The request could also have a degree of business urgency attached to it. As an example of starting or triggering the method of FIG. 1 by closing a service ticket, a system administrator could have been working on a problem associated with a particular server, and then closed a ticket for this work. However, when a ticket is closed, it frequently happens that a number of information items on the ticket are left blank. Accordingly, the method of FIG. 1 could be used to fill in some or all of the blank items, or validate data elements provided that appear to be of low quality and thus improve the quality level of data associated with the ticket.

After starting the method, it is necessary at step 104 to identify the type of a data element involved or associated with the triggering event. Frequently, the incoming data request will explicitly describe the data type, which is assumed to be the case for the embodiment shown by FIG. 1. However, if such information is not initially available, one of a number of actions can be taken, as described hereinafter in connection with the embodiment of FIG. 2, to determine either the data type of the associated data set, or a data type that is related thereto.

Referring further to FIG. 1, it is shown that step 106 sets an expected confidence level on the data element of the identified type, which is based on a stored record of the history of such type of data. For the embodiment of FIG. 1, it is assumed that a history record for data of the identified type is available. As discussed above, a data element of a particular type can contain errors, whether the data is provided by a human source or a server or the like. Confidence level is usefully expressed as a percentage of the likelihood that data set of a particular data type is completely true or accurate. If a system handles a number of data elements of a particular type over a period of time, it may iteratively determine a confidence level value representing the accuracy of data elements of such type. Confidence level can also be thought of as the probability of a ground truth.

As an example of confidence level, data could be requested that indicates how servers were classified for use in a given industry (such as print server, infrastructure server, application server, etc.). However, the available data element may show that servers were classified in one data repository as having a certain use or purpose, and were classified in a different repository as having a different use or purpose. Thus, the data collectively would have a confidence level that was computed to be a percentage value of less than 100%.

At step 108, it is necessary to identify any gaps in the data associated with an incoming data request, or with a closed ticket. In the method of FIG. 1, a gap may be identified if it was found at step 106 that the confidence level of the data element was less than 100%. Alternatively, for certain types of enterprise data, there could be a requirement that the confidence level must be no less than a specified threshold value, such as 80%. Thus, a gap could be identified at step 108, if the confidence level determined at step 106 for such data element was less than the specified threshold value, such as 75%.

Following step 108, the method proceeds to step 110 to locate subject matter expert (SME) candidates. This task uses information such as existing ticket logs and system access logs to identify SMEs who are likely to be most familiar with data of the type associated with the incoming data request or ticket. Selection of suitable SME candidates is described hereinafter in further detail, in connection with FIG. 3. Usefully, the total number of located SMEs could be on the order of 2-5, for a wide range of uses of the method of FIG. 1.

At decision step 112, it is determined whether the ticket or incoming data request of step 102 is of a high priority. For example, an incoming data request may expressly state that it is of high priority. Alternatively, the request could pertain to a large service level agreement (SLA).

If the determination of step 112 is affirmative, the method proceeds to step 114. At this step a revise and validate request is dispatched to multiple SMEs using Simultaneous Verification. Accordingly, each of the SMEs will receive the request at the same time, and will be asked to respond back with any revisions, corrections or validations of the associated data element without waiting for action by any of the other SMEs. However, if the determination of step 112 is negative, the method proceeds to step 116, whereby a revise and validate request is dispatched to multiple SMEs using Sequential Verification. This will result in the SMEs responding back sequentially with their revisions or validations.

When an SME receives a request following either step 114 or 116, the SME considers the data element associated with the data request or ticket of step 102. The SME may make any revisions or corrections to the data that he or she determines to be necessary, based on the SME's familiarity with subject matter pertaining to the data. For example, if the data element included a ticket with blank items, the SME may correctly fill in some or all of the blank items. If the data element pertained to the purpose for which a group of servers was being used, the SME could recognize that some of the data stated such purpose incorrectly. The SME would then revise the data to show the correct purpose of server use. All such revisions and corrections, generated in response to a request of step 114 or 116, would then be made available for step 118 of FIG. 1.

The above actions of the SMEs could eliminate some or all of the gaps in a data element, and could increase the confidence level thereof. Data quality is thereby significantly improved. When a response of an SME includes a revision or correction, step 118 is carried out to update the related data in accordance with the correction, and re-evaluate data quality. Through loop 122, step 118 causes the method of FIG. 1 to perform an iteration using the revised or corrected data. More generally, each time data is updated at step 118 by the response of an SME, the method of FIG. 1 is carried out using the newly updated data. This iterative process will act to generate a quality baseline or threshold for the data element associated with the incoming data request or ticket, which initially began the process. This quality baseline may then be used for subsequent encounters or actions involving a data element of the same or similar type.

Processes of step 118 may also serve to identify the most reliable SME for a given data element, and can update SME profiles and rankings. If an incoming data request is based on a particular business account or the like, related accounts or players may also be discovered.

FIG. 1 further shows that results produced at step 118 may be stored or saved at step 120. For example, it may be determined at step 118 that no further iterations will be carried out.

Figure 2:
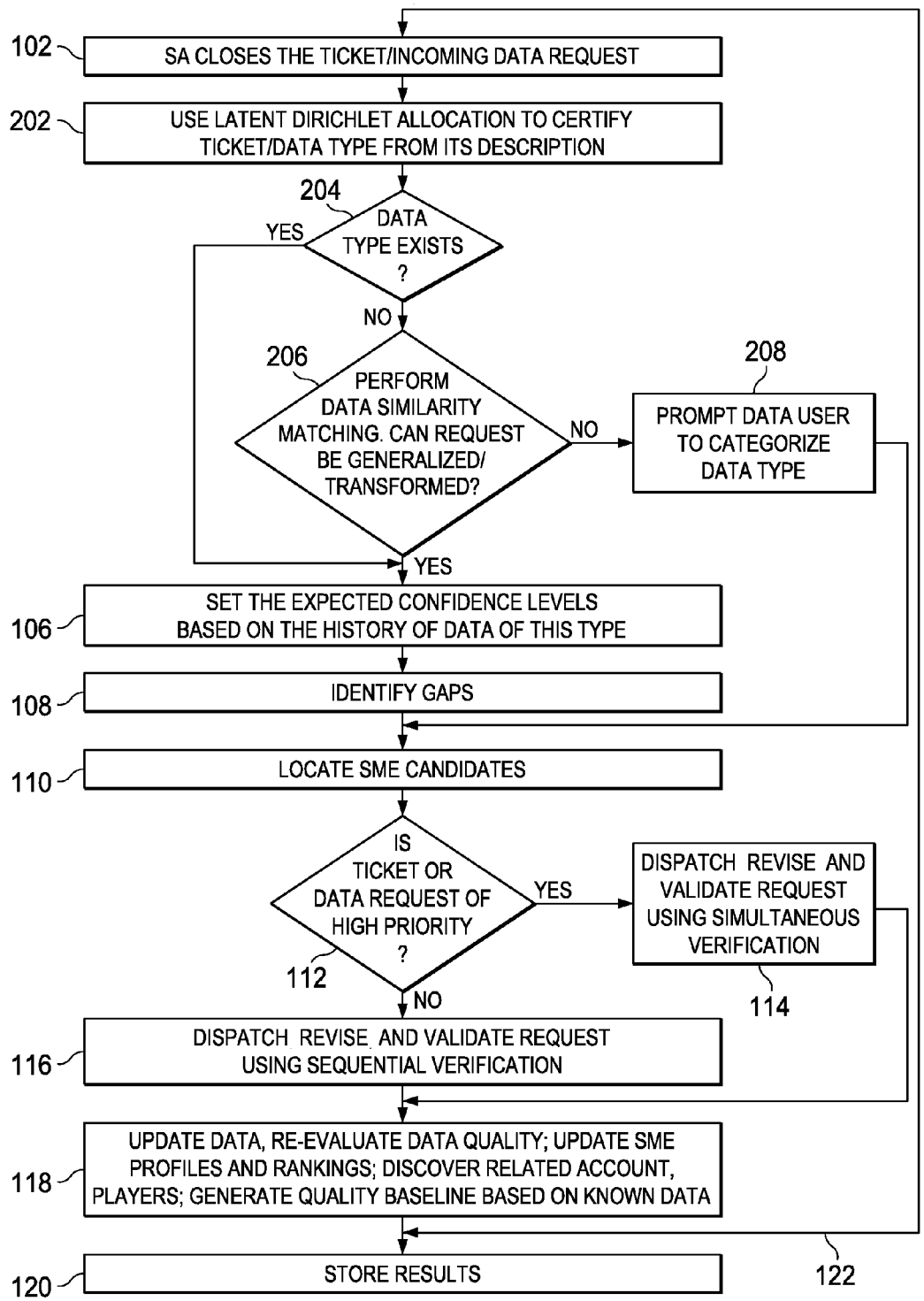
FIG. 2 is a flowchart showing steps for a method comprising an embodiment of the method of FIG. 1.

Referring to FIG. 2, there is shown a method comprising an embodiment of the invention that includes steps 102 and 106-120 of FIG. 1. Each of these steps carries out the task or function respectively described for it in the description of FIG. 1. In addition, FIG. 2 includes steps 202-208 and loop 122.

Responsive to an event such as an incoming data request or the closing of the ticket, the method of FIG. 2 commences. However, unlike the method of FIG. 1, the type of the data element associated with the commencing event may not be initially given or known. Accordingly, the method of FIG. 2 proceeds to step 202. This step uses a tool or model such as a Latent Dirichlet Allocation (LDA) to identify data type, from a general description of the incoming data. As is known by those of skill in the art, in LDA a document may be viewed as a mixture of various topics, wherein the topic distribution is assumed to have a Dirichlet prior. The LDA uses a general description of the incoming data to determine a topic or like classification, which reasonably comprises the type of such data.

At step 204, it is necessary to determine whether data of the type identified at step 202 exists, that is, is already located in a historical database available to the method of FIG. 2. If this determination is affirmative, the method proceeds to step 106, described above. However, if the determination is negative, the method proceeds to step 206.

At step 206, data similarity matching is performed. This determines whether the identified data type is similar to another type of data that is already in the historical database. The similarity must be sufficiently close to enable the incoming data request to be handled by using such other data.

As an example of data similarity matching, the data type for the incoming request of FIG. 2 could pertain to service tickets of a particular banking institution, which were missing a failure code. In the example, this type of data has not previously been used with the method of FIG. 2. However, the method has previously handled tickets of a different banking institution, which likewise were missing the failure code. Accordingly, data resulting from this previous activity may be used at step 106 for the incoming request. Thus, if the decision of step 206 is positive, the method of FIG. 2 proceeds to step 106, and otherwise proceeds to step 208.

At step 208, one who is familiar with the type of the data element associated with the incoming data request or ticket of step 102 is prompted to categorize such data, in order to provide a pertinent data type. This could be a user of such data element. The data type is then routed to step 110, so that such information is available for use in locating suitable SME candidates.

In the method of FIG. 2, after a number of SMEs have been selected and have been sent requests for revision and validation, each response from an SME will iterate the method, and cause data to be updated at step 118, as described above in connection with FIG. 1. This process will tend to evolve a quality baseline for the data type of the incoming data element, even though such data type was not known when the method was commenced at step 102.

The following algorithm may be used in carrying out tasks or processes of the method of FIG. 1 or FIG. 2. The algorithm parameters $\alpha$, $\beta$, $w_1, \ldots, w_T$, $\gamma$, and C are determined by the model used.

---

Inputs: model parameters $\alpha$, $\beta$, $w_1, \ldots, w_t$, $\gamma$, C and number of steps K;
s = 1
while s <= K do
Find the best sample template for data $x_{tem}$ using bi-convex optimization problem $$\min C_{x,p}(\alpha'x+\beta)^2 + p^1[w_1, w_2, \ldots w_T]'x + p'\gamma \qquad \text{Eqn. (1)}$$

constrained to
C>=0, p>=0, $\Sigma_i p$=1 where p^ =$[p_1,\ldots p_T]'$ $\gamma$^ =$[\gamma_1 \ldots \gamma_T]'$ and C>=0
(trade-off between most uncertain points and points SMEs are confident on validating)
Find $x_j$, i.e., the nearest point x to $x_{tem}$;

-continued

Figure 3:
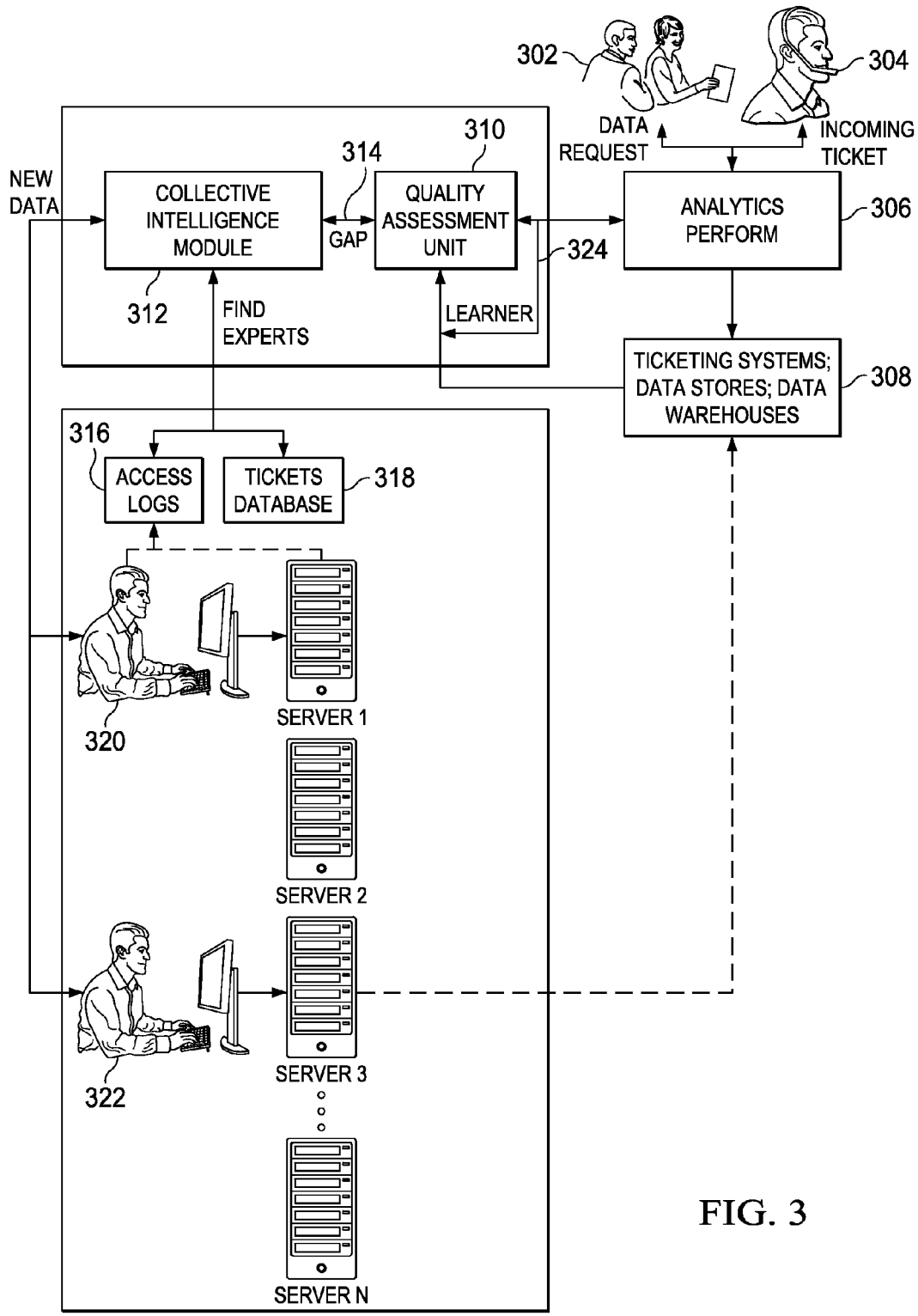
FIG. 3 is a schematic diagram showing components for implementing an embodiment of the invention.

Find the most reliable/confident SME for $x_j$ given the model learned up to this stage, using:
  $\sigma_i(x_i) = (1 + \exp(-w^t x_i - \gamma_i))^{-1}$
  (binary classification is a logistic function of $x_i$ and t) Eqn. (2)
Re-train the model with new data point $x_j$ and label (update $\alpha$, $\beta$, $w_1$,..., $w_T$, $\gamma_i$);
s = s + 1;
end while
RETURN $\alpha$, $\beta$, $w_1$,..., $w_T$, $\gamma$ Further Details
(1) $x_1 \ldots x_n$ data points (e.g. server purpose or ticket failure code)
(2) Label for i-th data point given by SME t is $\gamma^{(t)}_i$
(3) $\alpha$, $\beta$, $\{w_T\}$, $\{\gamma_T\}$ are estimated through maximum likelihood criterion
(4) X—data point, Y—annotation, Z—ground truth used for future estimates—trains the data classifier using probabilistic model
(5) $P_1 \ldots P_T$ are probabilities The following is an example of the above algorithm:
X=collection of N points $x_1 \ldots x_n$
Y represents a set of associated values with each point
Model produces an estimate for ground-truth Z, prediction value z for new instances of x
Model of SME's expertise is a function of the input x (e.g. based on the server hostname or a ticket type), e.g. x=b-p-infra.acme.com
$Y_1$=infrastructure_server
$Y_2$=print_server
true (unknown value of i-th data point Z, (e.g. what is the real "purpose" of the given server or a ticket type))
value for the i-th data point given by expert t as $y^{(t)}$ (a value given by expert t for $x_i$), e.g.: John classifies the server b-p-infra.acme.com as a print server, Peter classifies the server b-p-infra.acme.com as an infrastructure server Further Details
(1) Internally the learning method relies on a distribution function to evaluate $p(Z_i | x_i)$
(2) Parameters $\alpha$ and $\beta$ are set to 0 and estimated during the learning stage of algorithm
(3) (logistic regression)
(4) $\alpha$=Y intercept
(5) $\beta$=regression coefficient
(6) Typically estimated by the maximum likelihood method Referring to FIG. 3, there are shown modules or components for implementing an embodiment of the invention, such as the method of FIG. 1 or FIG. 2. FIG. 3 depicts a business analyst 302 or the like who generates a data request of the type that commences the method of FIG. 1 or FIG. 2, as described above. FIG. 3 further depicts a system administrator 304 who has provided an incoming ticket to trigger the method. Both the data request and incoming ticket are routed to an analytics platform 306.

Analytics platform 306 is connected to a data storage resource 308, which is configured to access data repositories, such as ticketing systems, data stores and data warehouses. Analytics platform 306 is further connected to a quality assessment unit 310, which is configured to implement the algorithm described above, and also to perform certain other processing tasks. When analytics platform 306 receives a data request or an incoming ticket, it directs data storage resource 308 to deliver pertinent data to quality assessment unit 310. Quality assessment unit 310 is then operated to carry out steps 104-108 of FIG. 1, or steps 202-208 and 106-108 of FIG. 2.

Referring further to FIG. 3, if a gap is identified in a data element processed by quality assessment unit 310, quality assessment unit 310 sends a gap notification 314 to a collective intelligence module 312. Collective intelligence module 312 is used in locating SMEs for the methods of FIGS. 1 and 2. More particularly, collective intelligence module 312 obtains data from sources exemplified by access logs 316 and a tickets database 318. Access logs 316 identify the system administrators who worked on respective servers 1-n, and further identify in detail what was done on each server. Tickets database 318 identifies the administrators who have handled respective tickets.

It will be readily apparent that by obtaining the above information, collective intelligence module 312 can determine the system administrators who are most knowledgeable about particular servers and tickets, and would therefore be the best SMEs for issues relating to those servers and tickets. System administrators are exemplified in FIG. 3 by administrators 320 and 322. Also, the information pertaining to an administrator can be updated very quickly. For example, if an administrator had previously worked only on servers 1 and 2, but was then observed logging into server 3, this information would be routed immediately to collective intelligence module 312. Moreover, equation (2) of the algorithm described above, which is intended to determine the most reliable SMEs, may also be used in the process of locating SMEs.

After SMEs have been selected and revise and validate requests have been dispatched to them, responses of respective SMEs will be received back. Each response will be delivered to quality assessment unit 310, which will use revisions and corrections contained in respective responses to update data and re-evaluate data quality. Quality assessment unit 310 thus carries out a learning procedure, as shown by loop 324 of FIG. 3.

By means of the embodiment of the invention shown for example by FIG. 3, a data element can be assigned to corresponding experts for correction and verification, based on the expert's access history in regard to the servers or other components that pertain to the data element. Low quality, incomplete, or inaccurate data elements can thereby be automatically discovered, with a confidence level assigned. Data elements can be classified to derive expected confidence levels, based on historical values, and data elements can be bundled and assigned to the most appropriate experts. There can also be exception handling, to evaluate unknown, potentially non-repeatable data elements.

Figure 4:
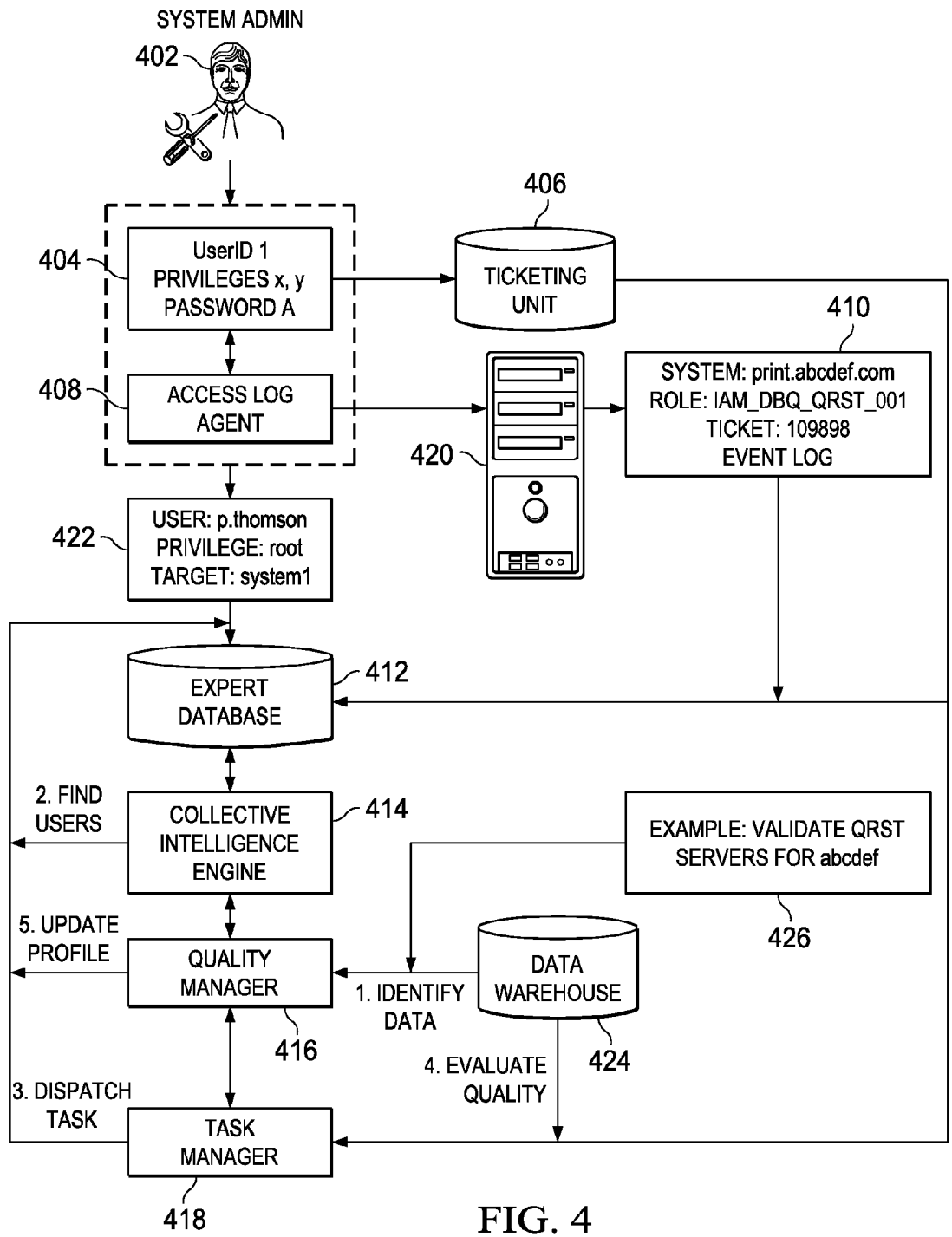
FIG. 4 shows an architectural view of components for an embodiment of the invention.

Referring to FIG. 4, there is shown an architectural view of components for an embodiment of the invention. More particularly, there is shown a user, such as system administrator 402, who is experienced in working on system components that include QRST servers. Information used by system administrator 402 to access such servers, and to prepare tickets in regard thereto, is shown at an access unit 404. Records pertaining to each access are maintained by an access log agent 408, wherein record 410 is an exemplary one of such records. Ticket information is maintained at a ticketing unit 406.

To implement an embodiment of the invention as described above, FIG. 4 discloses an expert database 412, a collective intelligence engine 414, a quality manager 416 and a task manager 418. For each system administrator 402, the database 412 is disposed to receive ticket information, and also records 410 by means of a processing unit 420, which respectively pertain to work performed by system administrator 402. Such information is stored in expert database 412 in connection with information 422 that identifies the administrator.

Referring further to FIG. 4, there is shown a data warehouse 424 or the like, which performs certain tasks that may make use of an embodiment of the invention. For example, data warehouse 424 may want to validate servers QRST, as shown by example 426.

Upon commencing an embodiment of the invention, such as by a data request associated with the data of example 426, quality manager 416 identifies the data as described above. Collective intelligence engine 414 and expert database 412 interact to find users, in order to locate SMEs. Task manager 418 then dispatches revision and validation tasks to the SMEs. After receiving responses from the SMEs, the quality of data upgraded by the responses is evaluated. Also, the profiles of respective SMEs may be updated.

FIG. 5 depicts a block diagram of a data processing system in accordance with an illustrative embodiment. Data processing system 500 is an example of a computer, which may be used to implement one or more components of embodiments of the invention, and in which computer usable program code or instructions implementing the processes may be located for the illustrative embodiments. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems, in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Memory 506, in these examples, may be, for example, a random access memory, or any other suitable volatile or non-volatile storage device. Persistent storage 508 may take various forms, depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 may be removable. For example, a removable hard drive may be used for persistent storage 508.

Communications unit 510, in these examples, provides for communication with other data processing systems or devices. In these examples, communications unit 510 is a network interface card. Communications unit 510 may provide communications through the use of either or both physical and wireless communications links.

Input/output unit 512 allows for the input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code, in the different embodiments, may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522. In one example, computer readable media 520 may be computer readable storage media 524 or computer readable signal media 526. Computer readable storage media 524 may include, for example, an optical or magnetic disc that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory that is connected to data processing system 500. In some instances, computer readable storage media 524 may not be removable from data processing system 500.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 518 may be downloaded over a network to persistent storage 508 from another device or data processing system through computer readable signal media 526 for use within data processing system 500. For instance, program code stored in a computer readable storage media in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide physical or architectural limitations to the manner in which different embodiments may be implemented. The different illustrative embodiments may be implemented in a data processing system including components in addition to and/or in place of those illustrated for data processing system 500. Other components shown in FIG. 5 can be varied from the illustrative examples shown. The different embodiments may be implemented using any hardware device or system capable of executing program code. As one example, data processing system 500 may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In association with a data processing system disposed to receive and process enterprise data, a method for managing data quality comprising the steps of:
    responsive to the data processing system receiving a specified data element, determining, by the data processing system, a data type of said specified data element;
    determining, by the data processing system, a confidence level of said specified data element;
    selecting, by the data processing system, a plurality of subject matter experts (SMEs) knowledgeable about the data type of said specified data element;
    responsive to the data processing system determining that an event having a high priority associated with said specified data element commenced said method, dispatching, by the data processing system, a request using Simultaneous Verification to each of said plurality of SMEs knowledgeable about the data type of said specified data element to revise and validate said specified data element;
    responsive to the data processing system determining that the event that commenced the method does not have a high priority, dispatching, by the data processing system, said request using Sequential Verification to each of said plurality of SMEs; and
    updating, by the data processing system, said specified data element in accordance with each revision provided by an SME of said plurality of SMEs knowledgeable about the data type of said specified data element in response to said request.

2. The method of claim 1, further comprising:
    using, by the data processing system, information contained in a server access log to select said plurality of SMEs knowledgeable about the data type of said specified data element.

3. The method of claim 1, further comprising:
    using, by the data processing system, historical information which pertains to the data type to determine the confidence level of said specified data element.

4. The method of claim 1, further comprising:
    identifying, by the data processing system, gaps in said specified data element, wherein the confidence level comprises a specified value, and wherein the data processing system identifies a gap in said specified data element when the specified value of the confidence level of said specified data element is less than a pre-specified threshold value.

5. The method of claim 1, wherein the data processing system uses the updates to said specified data element that are based on responses of said plurality of SMEs to the request to generate a quality baseline for said specified data element.

6. The method of claim 1, wherein said event is one of an incoming data request or an action closing a service ticket by a system administrator.

7. The method of claim 1, wherein the data processing system uses a Latent Dirichlet Allocation to determine said data type.

8. The method of claim 1, wherein the data processing system uses a data similarity matching procedure to determine said data type.

9. The method of claim 1, wherein the data processing system prompts a user associated with said specified data element to provide said data type.

10. In association with a data processing system disposed to receive and process enterprise data, a computer program product executable in a computer recordable readable storage medium memory, wherein said computer program product comprises:
    instructions, responsive to receiving a specified data element, for determining a data type of said specified data element;
    instructions for determining a confidence level of said specified data element;
    instructions for selecting a plurality of subject matter experts (SMEs) knowledgeable about the data type of said specified data element;
    instructions, responsive to determining that an event having a high priority is associated with said specified data element, for dispatching a request using Simultaneous Verification to each of said plurality of SMEs knowledgeable about the data type of said specified data element to revise and validate said specified data element;
    instructions, responsive to determining that the event associated with said specified data element does not have a high priority, for dispatching said request using Sequential Verification to each of said plurality of SMEs; and
    instructions for updating said specified data element in accordance with each revision provided by an SME of said plurality of SMEs knowledgeable about the data type of said specified data element in response to said request.

11. The computer program product of claim 10, further comprising:

instructions for using information contained in a server access log to select said plurality of SMEs knowledgeable about the data type of said specified data element.

12. The computer program product of claim 10, further comprising:
instructions for using historical information which pertains to the data type to determine the confidence level of said specified data element.

13. The computer program product of claim 10, further comprising:
instructions for identifying gaps in said specified data element, wherein the confidence level comprises a specified value, and wherein a gap is identified in said specified data element when the specified value of the confidence level of said specified data element is less than a pre-specified threshold value.

14. The computer program product of claim 10, wherein the updates to said specified data element that are based on responses of said plurality of SMEs to the request are used to generate a quality baseline for said specified data element.

15. The computer program product of claim 10, wherein said event is one of an incoming data request or an action closing a service ticket by a system administrator.

16. In association with a data processing system disposed to receive and process enterprise data, an apparatus comprising:
processing means, responsive to receiving a specified data element, for determining a data type of said specified data element;
processing means for determining a confidence level of said specified data element;
processing means for selecting a plurality of subject matter experts (SMEs) knowledgeable about the data type of said specified data element;
processing means, responsive to determining that an event having a high priority is associated with said specified data element, for dispatching a request using Simultaneous Verification to each of said plurality of SMEs knowledgeable about the data type of said specified data element to revise and validate said specified data element;
processing means, responsive to determining that the event associated with said specified data element does not have a high priority, for dispatching said request using Sequential Verification to each of said plurality of SMEs; and
processing means for updating said specified data element in accordance with each revision provided by an SME of said plurality of SMEs knowledgeable about the data type of said specified data element in response to said request.

17. The apparatus of claim 16, further comprising:
processing means for using information contained in a server access log to select said plurality of SMEs knowledgeable about the data type of said specified data element.

18. The apparatus of claim 16, further comprising:
processing means for using historical information which pertains to the data type to determine the confidence level of said specified data element.

19. The apparatus of claim 16, wherein the updates to said specified data element that are based on responses of said plurality of SMEs to the request are used to generate a quality baseline for said specified data element.

* * * * *